United States Patent Office 3,629,326
Patented Dec. 21, 1971

3,629,326
PERFLUORO - 1 - CYCLOALKEN-1,2-YLENE-DI-PHOSPHORYL COMPOUNDS AND PROCESS FOR THE PREPARATION THEREOF
Arlen W. Frank, Grand Island, N.Y., and Charles F. Baranauckas, Memphis, Tenn., assignors to Hooker Chemical Corporation, Niagara Falls, N.Y.
No Drawing. Original application Mar. 8, 1965, Ser. No. 438,105, now Patent No. 3,501,555, dated Mar. 17, 1970. Divided and this application Sept. 8, 1969, Ser. No. 870,803
Int. Cl. C07f 9/38; C11d 1/34
U.S. Cl. 260—502.4 P                                    2 Claims

ABSTRACT OF THE DISCLOSURE

A perfluoro - 1 - cycloalken - 1,2 - ylenediphosphoric acid of the formula

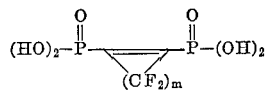

wherein $m$ is from 2 to 4.

---

This is a division of our parent application, S.N. 438,105, filed Mar. 8, 1965.

This invention relates to novel halogenated organophosphorus compounds and a method for preparing the same. More particularly, it relates to cyclic perfluoroolefins containing two phosphoryl (P=O) groups on adjacent unsaturated carbon atoms.

It is an object of this invention to prepare novel perfluoro - 1 - cycloalken - 1,2 - ylenediphosphoryl compounds. Other objects of the invention will be apparent from the following detailed description.

The novel compounds of this invention have the formula

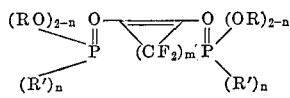

wherein R and R' are organic radicals independently selected from the group consisting of alkyl and substituted alkyl having from 1 to 12 carbon atoms, the most preferred of these have 1 to 6 carbon atoms; aryl and substituted aryl having from 6 to 15 carbon atoms, the most preferred of these have 6 to 9 carbon atoms; aralkyl and substituted oralkyl having from 7 to 20 carbon atoms, the most preferred of these have 7 to 10 carbon atoms; alkenyl and substituted alkenyl having from 2 to 12 carbon atoms, the most preferred of these have 2 to 6 carbon atoms; cycloalkyl and substituted cycloalkyl having from 3 to 15 carbon atoms, the most preferred of these have 3 to 8 carbon atoms; and heterocyclic and substituted heterocyclc having from 1 to 15 carbon atoms, the most preferred of these have 1 to 8 carbon atoms, $m$ is from 2 to 4, and $n$ is from 0 to 2.

The substituents present on the alkyl, aryl, aralkyl, alkenyl, cycloalkyl, and heterocyclic radicals may be halogen, nitro, amino, substituted amino, hydroxy, alkoxy, mercapto, carbonyl, carboxy, cyano, and the like.

In accordance with the practice of this invention, it has been found that the novel compounds of this invention can be prepared in excellent yields by reacting a perfluorocycloalkene (hereinafter referred to as cycloalkene) selected from the group consisting of 1,2-dichloroperfluorocycloalkene and 1,2 - dibromoperfluorocycloalkene, the most preferred of these include 1,2-dichlorotetrafluorocyclobutene, 1,2 - dichlorohexafluorocyclopentene and 1,2 - dichlorooctafluorocyclohexane, with a phosphorus-containing compound of the formula

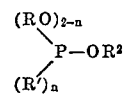

wherein R and R¹ are as previously defined, R² is selected from the group consisting of alkyl and substituted alkyl having from 1 to 12 carbon atoms, the most preferred of these have 1 to 6 carbon atoms; aralkyl and substituted aralkyl having from 7 to 20 carbon atoms, the most preferred of these have 7 to 10 carbon atoms; alkenyl and substituted alkenyl having from 2 to 12 carbon atoms, the most preferred of these have 2 to 6 carbon atoms; cycloalkyl and substituted cycloalkyl having from 3 to 15 carbon atoms, the most preferred of these have 3 to 8 carbon atoms, and $n$ is from 0 to 2.

Typical phosphorus-containing compounds which may be employed in the practice of this invention include, triesters of phosphorus acid such as trimethyl phosphite, triethyl phosphite, triisopropyl phosphite, tributyl phosphite, diethyl butyl phosphite, ethyl propylene phosphite, methyl phenylene phosphite, tris(2 - chloroethyl) phosphite, trially phosphite, diethyl phenyl phosphite and tris (1-butoxyethyl) phosphite; diesters of phosphorous acids such as diethyl ethylphosphonite, diethyl phenylphosphonite, dibutyl hexylphosphonite, and bis(2 - chloroethyl) benzylphosphonite; and esters of phosphinous acids such as ethyl diphenylphosphinite, butyl dihexylphosphinite, allyl diethylphosphinite, and the like.

The following equation, wherein the cycloalkene is a 1,2 - dichloroperfluorocycloalkene and the phosphorus-containing compound in a dialkylarylphosphonite, illustrates generally this invention:

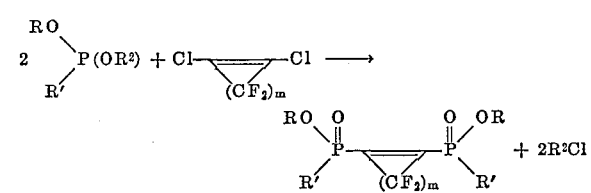

In the practice of this invention the cycloalkene and the phosphorus-containing compound may be reacted in any suitable reaction vessel, so that, the reaction may be continuous, intermittent, or batch-type. The reactants may be reacted or added to the reaction zone simultaneously, as for example, when the reaction is carried out continuously in a column, or in any sequence, as for example when the reaction is carried out batchwise, without departing from the scope of this invention. Conveniently, the phosphorus-containing compound may be added to the cycloalkene previously preheated to reflux at a rate sufficient to maintain a steady evolution of the alkyl halide.

In general, the reaction takes place at temperatures ranging from 0 degrees centigrade to 200 degrees centigrade, preferably from 30 degrees centigrade to 180 degrees centigrade, and most preferably from 50 degrees centigrade to 120 degrees centigrade. Atmospheric pressure is usually employed, but pressure in excess or less than atmospheric may also be employed. For example, when R² is methyl or ethyl, so that a gaseous by-product is formed, the reaction is conveniently carried out at atmospheric pressure, preferably at a temperature in the range of 50 degrees centigrade and the boiling point of the cycloalkene. When R² is such that the organic halide formed is not volatile, the reaction is conveniently carried out in a sealed vessel under autogenous pressure.

If desired, the reaction may be carried out in the presence of an organic solvent, such as a hydrocarbon or an alcohol, although the use of a solvent is not ordinarily essential. Removal of the evolved organic halide may be facilitated if the solvent chosen is such as to permit azeotropic distillation. Typical examples of such solvent include toluene, xylene, and the like.

The relative amounts of the reactants employed may vary, although it is desirable that excesses of either reactant be avoided. The molar ratio of phosphorus-containing compound to cycloalkene may be in the range of 0.05 mole to 6 moles of phosphorus-containing compound per mole of cycloalkene, preferably between 0.5 mole to 3 moles of phosphorus-containing compound per mole of cycloalkene, the most preferred molar proportion being a substantially stoichiometric proportion of 2 moles of phosphorus-containing compound to 1 mole of cycloalkene.

After the reaction has been conducted for a period of time sufficient to obtain the maximum yield, generally from 10 minutes to 10 hours, the reaction product is separated from the reaction mixture. The separation may be accomplished by any suitable means which include distillation, extraction, and the like.

The compounds of this invention may be converted by suitable methods to useful derivatives. For example, the diphosphonate esters of this invention may be hydrolyzed to yield diphosphonic acids of the formula

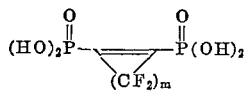

wherein $m$ is from 2 to 4. While the diphosphinate esters of this invention may be hydrolyzed to yield phosphinic acids of the formula

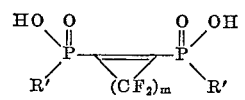

wherein R′ is as previously defined, and $m$ is from 2 to 4.

Additionally, the acids of this invention may be reacted with phosphorus pentachloride or phosphorus pentabromide to yield diphosphoryl halide compounds of the formula

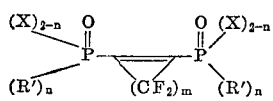

wherein X is selected from the group consisting of chlorine and bromine, R′ is an organic radical as previously defined, $m$ is from 2 to 4, and $n$ is from 0 to 1.

It is also within the scope of this invention to prepare unsymmetrical diphosphoryl compounds of the formula

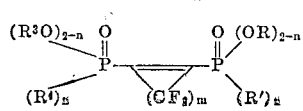

wherein R³ and R⁴ are independently selected from the group consisting of R and R′ as previously defined, and R and R′ are as previously defined, $m$ is from 2 to 4, and $n$ is from 0 to 2.

These unsymmetrical diphosphoryl compounds may be prepared by employing two or more phosphorus-containing compounds previously described as the reactants in the process of this invention.

The preferred embodiment for the preparation of the unsymmetrical diphosphoryl compounds comprises reacting a 2-haloperfluoro-1-cycloalken-1-ylphosphoryl compound (hereinafter referred to as cycloalkenemonophosphoryl) of the formula

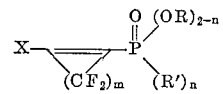

wherein X is selected from the group consisting of chlorine and bromine, R and R′ are organic radicals as previously defined, $m$ is from 2 to 4, and $n$ is from 0 to 2, with a phosphorus-containing compound of the formula

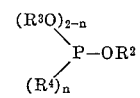

wherein R³ and R⁴ are independently selected from the group consisting of R and R′ as previously defined, R² is as previously defined, and $n$ is from 0 to 2.

As the cycloalkene monophosphoryls there can be used compounds such as dibutyl-2-chlorohexafluoro-1-cyclopenten-1-ylphosphonate, dimethyl-2-chlorohexafluoro - 1-cyclopenten-1-ylphosphonate, ethyl-2-chlorohexafluoro-1-cyclopentene - 1 - ylphenylphosphinate, diethyl-1 - chlorohexafluoro-1-cyclopenten-1-ylphosphonate, and the like. A process for the preparation of the above-described compound is disclosed in a copending application filed Mar. 8, 1965, and illustrated herein by Example 13.

The reaction conditions of the preferred embodiment are as previously described wherein the reactants are present preferably in a substantially stoichiometric ratio of 1 to 1.

The compounds of the invention are generally useful as leveling agents for floor waxes, where they also contribute a resistance to water spotting; as plasticizers for polyvinyl chloride resins; as cell modifiers for urethane foams; as surface active agents; as insecticides; and as additive for extreme pressure lubricants, where their use imparts improved wear properties to the lubricants. The compounds are particularly useful as metal extractants and sequestering agents.

The following examples are presented to illustrate the novel compounds of this invention and their preparation. It is to be understood that the examples are not to be construed as limiting the invention except as defined in the appended claims. All temperatures are in degrees centigrade and all parts are by weight, unless otherwise mentioned.

EXAMPLE 1

A mixture of 24.5 parts of 1,2-dichloro-3,3,4,4,5,5-hexafluorocyclopentene and 33.2 parts of triethyl phosphite was heated to reflux and maintained at reflux until the evolution of ethyl chloride subsided (30 minutes). At the end of this time a test for unreacted phosphite was found to be negative. The resulting solution was distilled, giving 6.5 parts (20 percent) of diethyl ethylphosphonate distilling at 65–135 degrees centigrade, at 1 millimeter of absolute pressure, followed by 33.4 parts (74 percent) of tetraethyl-3,3,4,4,5,5-hexafluoro-1 - cyclopenten - 1,2 - ylenediphosphonate, boiling point 122–148 degrees centigrade, at 0.4 millimeter of absolute pressure. This product is a new compound having the structure

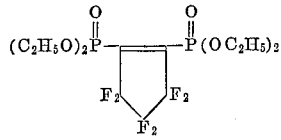

A portion of this product was redistilled, providing an analytical sample, boiling point 111–112 degrees centigrade, at 0.1 millimeter of absolute pressure, and refractive index ($n^{20}_D$) 1.4167. The product contained 35.09 percent carobn, 4.59 percent hydrogen, 25.27 percent fluorine, 13.3 percent phosphorus. The calculated percentages of these elements in $C_{13}H_{20}F_6O_6P_2$ are 34.83 percent carbon, 4.50 percent hydrogen, 25.43 percent fluorine, 13.82 percent phosphorus.

EXAMPLE 2

This example illustrates the effect of a non-stiochiometric ratio of the reactants on the course of the reaction of a phosphorus ester with a cycloalkene. 33.2 parts of triethyl phosphite were added dropwise over a 14 minute period to 49.0 parts of 1,2-dichloro-3,3,4,4,5,5-hexafluorocyclopentene at reflux, followed by refluxing until the ethyl chloride evolution subsided. At the completion of the reaction there were recovered 2.5 parts (8 percent) of diethyl ethylphosphonate, 33.0 parts (37 percent) of tetraethyl-3,3,4,4,5,5-hexafluoro-1 - cyclopenten - 1,2 - ylenediphosphonate, and 24.1 parts (49 percent) of unreacted 1,2-dichloro-3,3,4,4,5,5-hexafluorocyclopentene. When the order of addition was reversed, the cycloalkene being added to the triethyl phosphite at 90–100 degrees centigrade, the products were 10 percent of diethyl ethylphosphonate, 35 percent of tetraethyl-3,3,4,4,5,5-hexafluoro-1 - cyclopenten-1,2-ylenediphosphonate, and 54 percent of unreacted 1,2-dichloro-3,3,4,4,5,5--hexafluorocyclopentene.

It is seen that the use of a 1:1 molar ratio of the reactants does not result in the formation of a monophosphonate ester.

EXAMPLE 3

A mixture of 24.5 parts of 1,2-dichloro-3,3,4,4,5,5-hexafluorocyclopentene and 24.8 parts of trimethyl phosphite was heated to reflux and maintained at reflux until the gas evolution subsided and a test for unreacted phosphite was negative (7.5 hours). Distillation of the resulting mixture gave 11.1 parts (45 percent) of unreacted 1,2-dichloro-3,3,4,4,5,5-hexafluorocyclopentene, 13.8 parts (56 percent) of dimethyl methylphosphonate, and 15.5 parts (40 percent) of tetramethyl-3,3,4,4,5,5-hexafluoro-1-cyclopenten-1,2-ylenediphosphonate, boiling point 132–134 degrees centigrade, at 0.4 millimeter of absolute pressure, with a refractive index $n^{20}_D$ of 1.4159. The product contained 27.53 percent carbon, 3.24 percent hydrogen, 28.90 percent fluorine, 15.7 percent phosphorus. The calculated percentages of these elements in $C_9H_{12}F_6O_6P_2$ are 27.56 percent carbon, 3.09 percent hydrogen, 29.07 percent fluorine, 15.80 percent phosphorus.

EXAMPLE 4

A pressure bottle was charged with 24.5 parts of 1,2-dichloro-3,3,4,4,5,5-hexafluorocyclopentene and 75.0 parts of tributyl phosphite, sealed, and heated in a water bath for 4 hours at 60 degrees centigrade, followed by 6 hours at 90 degrees centigrade. The consumption of phosphite, measured by titration of an aliquot with 0.1 N iodine in benzene, was 10.0 parts after the first heating period and 46.3 parts after the second. The theoretical consumption was 50.0 parts. The resulting solution was distilled, giving 16.5 parts of butyl chloride, boiling point 81–83 degrees centigrade, $n^{25}_D$ 1.3981, and 25.2 parts of recovered tributyl phosphite. The undistilled residue, 51.9 parts, $n^{25}_D$ 1.4262, was a viscous liquid which was identified by analysis as tetrabutyl-3,3,4,4,5,5-hexafluoro-1-cyclopenten-1,2-ylenediphosphonate. The product contained 11.4 percent phosphorus, 0 percent chlorine. The calculated percentages of these elements in $C_{21}H_{36}F_6O_6P_2$ are 11.05 percent phosphorus, 0 percent chlorine. The product gave a positive test for unsaturation with aqueous potassium permanganate. An analytical sample was prepared by distilling a portion of the product at 0.004 millimeter of absolute pressure in a Hickman molecular still; boiling point 90–105 degrees centigrade, at 0.004 millimeter of absolute pressure, refractive index $n^{25}_D$ 1.4261, density $d^{20}_4$ 1.1964. The product contained 45.22 percent carbon 6.61 percent hydrogen, 20.7 fluorine, 10.9 percent phosphorus. The calculated percentages of these elements in $C_{21}H_{36}F_6O_6P_2$ are 45.00 percent carbon, 6.48 percent hydrogen, 20.34 percent fluorine, 11.05 percent phosphorus.

EXAMPLE 5

80.8 parts of triallyl phosphite and 49.0 parts of 1,2-dichloro-3,3,4,4,5,5-hexafluorocyclopentene were reacted together following the procedure of Example 1. Tetraallyl-3,3,4,4,5,5-hexafluoro-1-cyclopenten - 1,2 - ylenediphosphonate was recovered as an almost colorless liquid, 90.9 parts (92 percent) $n^{25}_D$ 1.4521, $d^{20}_4$ 1.2040. The product contained 13.5 percent phosphorus, 0 percent chlorine. The calculated percentages of these elements in $C_{17}H_{20}F_6O_6P_2$ are 12.48 percent phosphorus, 0 percent chlorine.

EXAMPLE 6

A solution of 640 parts of bromine in 1600 parts of carbon tetrachloride was added dropwise over a 4 hour period to a refluxing solution of 454 parts of tetraallyl-3,3,4,4,5,5-hexafluoro-1-cyclopenten-1,2 - ylenediphosphonate, prepared as described in Example 5, in 3200 parts of carbon tetrachloride. A heat lamp was used to speed the reaction. From the resulting solution there was recovered 1047 parts (100 percent) of tetrakis(2,3-dibromopropyl)-3,3,4,4,5,5 - hexafluoro - 1 - cyclopenten - 1,2-ylenediphosphonate as a dark-colored, heavy oil. The product contained 56.1 percent bromine, 5.45 percent phosphorus. The calculated percentages of these elements in $C_{17}H_{20}Br_8F_6O_6P_2$ are 56.3 percent bromine, 5.46 percent phosphorus. The uptake of bromine corresponded to the unsaturation in the four allyl groups, the cycloalkene double bond being preserved.

EXAMPLE 7

33.2 parts of triethyl phosphite were added dropwise to 29.5 parts of 1,2-dichloro-3,3,4,4,5,5,6,6-octafluorocyclohexenes at 90–100 degrees centigrade. Little gas evolution was observed. After 10 minutes the reaction temperature was raised to reflux, whereupon a steady gas evolution was observed. At the completion of the reaction the solution was distilled, giving 12.3 parts (37 percent) of diethyl ethylphosphonate, boiling point 52–54 degrees centigrade, at 0.5 millimeter of absolute pressure, $n^{24}_D$ 1.4111, followed by 25.5 parts (51 percent) of tetraethyl-3,3,4,4,5,5,6,6-octafluoro-1-cyclohexen - 1,2 - ylenediphosphonate, boiling point 120–135 degrees centigrade, at 0.4 millimeter of absolute pressure, $n^{25}_D$ 1.4140. The product contained 12.5 percent phosphorus, 0.14 percent chlorine. The calculated percentages of these elements in $C_{14}H_{20}F_8O_6P_2$ are 12.45 percent phosphorus, 0 percent chlorine. This product is a new compound having the structure

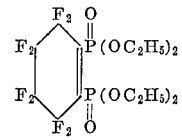

EXAMPLE 8

33.2 parts of triethyl phosphite were added dropwise to 19.5 parts of 1,2-dichloro-3,3,4,4-tetrafluorocyclobutene over a 50 minute period at reflux (68 degrees centigrade). Gas evolution continued for an additional hour, following which a test for unreacted phosphite was negative. The product was stripped of volatile by-products at 90 degrees centigrade, at 0.5 millimeter of absolute pressure, leaving 40.6 parts (100 percent) of tetraethyl-3,3,4,4-tetrafluoro-1-cyclobuten-1,2-ylenediphosphonate as an undistilled yellow liquid, $n^{25}D$ 1.4208. The product contained 36.20 percent carbon, 5.20 percent hydrogen, 18.95 percent fluorine, 15.2 percent phosphorus. The calculated percentages of these elements in $C_{12}H_{20}F_4O_6P_2$ are 36.21 percent carbon, 5.06 percent hydrogen, 19.08 percent fluorine, 15.55 percent phosphorus. This product is a new compound having the structure

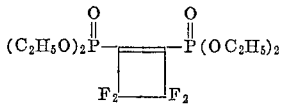

EXAMPLE 9

42.8 parts of diethyl phenylphosphite were added dropwise over a 1 hour period to 24.5 parts of refluxing 1,2-dichloro-3,3,4,4,5,5-hexafluorocyclopentene, and heating continued until the phosphite was all consumed (10 hours). Distillation of the resulting solution gave 14.5 parts (34 percent) of ethyl phenyl ethylphosphonate, boiling point 108–109 degrees centigrated, at 0.5 millimeter of absolute pressure, $n^{24}D$ 1.4897, and 11.0 parts (45 percent) of recovered 1,2-dichloro-3,3,4,4,5,5-hexafluorocyclopentene. The residue was identified by analysis as symmetrical diethyl diphenyl-3,3,4,4,5,5-hexafluoro-1-cyclopenten-1,2-ylenediphosphonate, 33.6 parts (62 percent), $n^{25}D$ 1.4897. The product contained 11.5 percent phosphorus, 0 percent chlorine. The calculated percentages of these elements in $C_{21}H_{20}F_6O_6P_2$ are 11.38 percent phosphorus, 0 percent chlorine.

EXAMPLE 10

19.8 parts of diethyl phenylphosphonite were added dropwise to 12.3 parts of 1,2-dichloro-3,3,4,4,5,5-hexafluorocyclopentene at 90–100 degrees centigrade and heated at that temperature until no more ethyl chloride was evolved. From this product were recovered 8.8 parts (34 percent) of diethyl P,P'-diphenyl-3,3,4,4,5,5-hexafluoro-1-cyclopenten-1,2-ylenediphosphinate, boiling point 174–176 degrees centigrade, at 0.45 millimeter of absolute pressure. The product contained 12.6 percent phosphorus. The calculated percentage of this element in $C_{21}H_{20}F_6O_4P_2$ is 12.09 percent phosphorus. The product has the structure

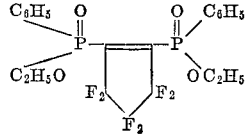

EXAMPLE 11

23.0 parts of ethyl diphenylphosphinite were added dropwise over a 20 minute period of 12.3 parts of refluxing 1,2-dichloro-3,3,4,4,5,5-hexafluorocyclopentene, heated an additional 20 minutes at 90–100 degrees centigrade, and allowed to cool. The product, 29.2 parts, crystallized when rubbed with ethyl acetate. One recrystallization from ethyl acetate gave 21.6 parts (75 percent) of 3,3,4,-4,5,5-hexafluoro-1-cyclopenten-1,2-ylene - P,P,P',P' - tetraphenylbis(phosphine oxide) as a white, crystalline solid, melting point 176–177 degrees centigrade. The product contained 60.46 percent carbon, 3.81 percent hydrogen, 19.03 percent fluorine, 11.1 percent phosphorus. The calculated percentages of these elements in $C_{29}H_{20}F_6O_2P_2$ are 60.42 percent carbon, 3.50 percent hydrogen, 19.78 percent fluorine, 10.75 percent phosphorus. This product is a new compound having the structure

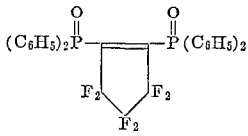

EXAMPLE 12

12.5 parts of tributyl phosphite were added dropwise over a 15 minute period to 17.3 parts of diethyl-2-chloro-3,3,4,4,5,5 - hexafluoro - 1 - cyclopenten-1-ylphosphonate. A new compound prepared by the method described in co-pending application filed March 8, 1965, and having the structure

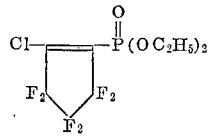

which compound had been preheated to 120 degrees centigrade before the start of the addition. The reaction was exothermic. Distillation of the resulting solution gave 1.5 parts of butyl chloride, boiling point 76.5–78 degrees centigrade, $n^{23}D$ 1.3991, and 21.1 parts (84 percent) of unsymmetrical dibutyl diethyl-3,3,4,4,5,5-hexafluoro - 1 - cyclopenten - 1,2 - ylenediphosphonate, boiling point 150–152 degrees centigrade, at 0.35 millimeter of absolute pressure, $n^{23}D$ 1.4208. The product contained 40.28 percent carbon, 5.81 percent hydrogen, 22.87 percent fluorine, 12.2 percent phosphorus, 0.1 percent chlorine. The calculated percentages of these elements in $C_{17}H_{28}F_6O_6P_2$ are 40.48 percent carbon, 5.60 percent hydrogen, 22.60 percent fluorine, 12.28 percent phosphorus, 0 percent chlorine. The product is a new compound having the structure

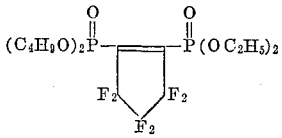

EXAMPLE 13

This example illustrates the preparation of a monophosphoryl cycloalkene compound by the process of co-pending application referred to above.

49.6 parts of trimethyl phosphite were added dropwise over a 30 minute period to 91.4 parts of 1-chloro-2,3,3,4,4,5,5-heptafluorocyclopentene, with external cooling as required to maintain the temperature between 25 degrees centigrade and 35 degrees centigrade. The reaction was exothermic and a gas was evolved. Following the addition, the reaction mixture was stirred at room temperature until the exotherm subsided, and then heated briefly to 100 degrees centigrade. A test for unreacted phosphite was negative. The solution was twice distilled, giving a 38 percent yield of dimethyl-2-chloro-3,3,4,4,5,5-hexafluoro - 1 - cyclopenten - 1 ylphosphonate as a colorless, fuming liquid, boiling point 64–66 degrees centigrade, at 4.5 millimeters of absolute pressure, refractive index $n^{25}D$ 1.3817, density $d_4^{20}$ 1.6669. The product contained 11.1 percent chlorine, 9.9 percent phosphorus. The calculated percentages of these elements in $C_7H_6ClF_6O_3P$ are 11.13 percent chlorine, 9.73 percent phosphorus. This product is a new compound having the structure

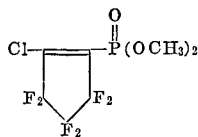

EXAMPLE 14

448 parts of tetraethyl-3,3,4,4,5,5-hexafluoro-1-cyclopenten-1,2-ylenediphosphonate, prepared essentially as described in Example 1, were added over a 6 hour period to four liters of boiling 19 percent hydrochloric acid. The rate of addition was adjusted to maintain a steady evolution of ethyl chloride. After the addition, heating was continued until the gas evolution subsided (8 hours). The solution was then stripped to dryness under reduced pressure leaving 334 parts (99.5 percent) of 3,3,4,4,5,5-hexafluoro - 1 - cyclopenten - 1,2 - ylenediphosphonic acid as a hygroscopic, crystalline solid, melting point 194–199 degrees centigrade, with decomposition. The product contained 17.6 percent phosphorus, 0 percent chlorine. The calculated percentages of these elements in $C_5H_4F_6O_6P_2$ are 18.5 percent phosphorus, 0 percent chlorine.

When equimolar quantities of a compound such as tetraethyl tetrafluoro - 1 - cyclobuten - 1,2 - ylenediphosphonate or tetraethyl octafluoro-1-cyclohexen-1,2-ylenediphosphonate are used in place of tetraethyl hexafluoro-1-cyclopenten-1,2-ylenediphosphonate the corresponding compound is formed.

This product is a new compound having the structure

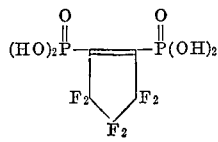

The acid was soluble in water, ethanol and other polar solvents, and insoluble in hydrocarbon solvents and in chlorinated hydrocarbon solvents. Titration with 0.1 N sodium hydroxide solution gave a curve with the appearance of a tribasic acid, with the major inflection point at pH 8.2 corresponding to the ¾ point in the titration.

The acid was converted to its dianilinium salt by adding aniline dropwise to a portion of the acid dissolved in acetone. The salt melted at 267 degrees centigrade with decomposition, after recrystallization from ethanol. The product contained 38.83 percent carbon, 3.34 percent hydrogen, 5.47 percent nitrogen. The calculated percentages of these elements in $C_{17}H_{18}F_6N_2O_6P_2$ are 39.09 percent carbon, 3.47 percent hydrogen, 5.36 percent nitrogen.

EXAMPLE 15

A solution of 114.0 parts of 3,3,4,4,5,5-hexafluoro-1-cyclopenten-1,2-ylenediphosphonic acid, prepared as described in Example 14, in 840 parts of phosphorus oxychloride was treated with 298.0 parts of phosphorus pentachloride in several portions over a 30 minute period at 30–40 degrees centigrade. Gas evolution was brisk. The temperature was then raised to and maintained at 76 degrees centigrade until the gas evolution subsided. Distillation of this solution gave 90.2 parts (65 percent) of 3,3,4,4,5,5 - hexafluoro - 1 - cyclopenten - 1,2 - ylenediphosphonic tetrachloride, boiling point 89–90 degrees centigrade, at 0.45 millimeter of absolute pressure, which solidified on cooling and then melted at 78.5–81.5 degrees centigrade. The product contained 33.2 percent chlorine, 15.2 percent phosphorus. The calculated percentages of these elements in $C_5Cl_4F_6O_2P_2$ are 34.6 percent chlorine, 15.1 percent phosphorus. This product is a new compound, believed to have the structure

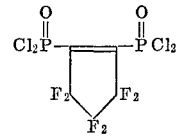

When equimolar quantities of a compound such as tetrafluoro - 1 - cyclobuten - 1,2 - ylenediphosphonic acid or octafluoro - 1 - cyclohexene - 1,2 - ylenediphosphonic acid are used in place of hexafluoro - 1 - cyclopenten-1,2-ylenediphosphonic acid, the corresponding compound is formed.

When equimolar quantities of phosphorus oxybromide and phosphorus pentabromide are used, respectively, in place of phosphorus oxychloride and phosphorus pentachloride, the corresponding compound is formed.

EXAMPLE 16

A solution of 29.8 parts of 3,3,4,4,5,5 - hexafluoro-1-clcyopenten - 1,2 - ylenediphosphonic tetrachloride, prepared as described in Example 15, in 88 parts of benzene was treated dropwise with 29.1 parts of trifluoroethanol over a 24 minute period at room temperature. Hydrogen chloride began to evolve during the addition and subsided after 7 hours stirring at room temperature. The solvent was stripped off under vacuum, leaving 43.1 parts of residue which gave on distillation 24.6 parts (51 percent) of tetrakis(2,2,2,-trifluoroethyl) - 3,3,4,4,5,5 - hexafluoro-1-cyclopenten - 1,2 - ylenediphosphonate, boiling point 84–86 degrees centigrade, at 0.1 millimeter of absolute pressure, $n^{24}D$ 1.3591, freezing at −28 degrees centigrade. The product contained 9.2 percent phosphorus, 1.6 percent chlorine. The calculated percentages of these elements in $C_{13}H_8F_{18}O_6P_2$ are 9.3 percent phosphorus, 0 percent chlorine.

EXAMPLE 17

A solution of 44.8 parts of tetraethyl - 3,3,4,4,5,5-hexafluoro - 1 - cyclopenten - 1,2 - ylenediphosphonate, prepared substantially as described in Example 1, in 600 parts of anhydrous ethanol was heated to reflux in a distillation apparatus. Distillate was drawn off from time to time as required to maintain the vapor temperature at 78 degrees centigrade. When no further depression in the vapor temperature was observed (72 hours), the remainder of the ethanol was stripped off under vacuum, leaving 40.5 parts of symmetrical diethyl dihydrogen-3,3,4,4,5,5 - hexafluoro - 1 - cyclopenten -, 1,2 - ylenediphosphonate as a slightly yellow, viscous liquid. The product contained 15.2 percent phosphorus. The calculated percentage of this element in $C_9H_{12}F_6O_6P_2$ is 15.8 percent phosphorus. This product is a new compound believed to have the structure

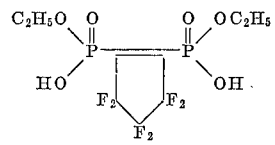

Table I illustrates the effectiveness of three of the compounds of the invention in the extraction of heavy metals. The table shows the percent thorium or uranium extracted from 20 milliliters of 6 N nitric acid solution containing 200 parts per million of the metal into 20 milliliters of a 0.05 M solution of the diphosphoryl compound in cyclohexane (or chloroform in the case of the phosphine oxide) after 5 minutes shaking on a mechanical shaker. It is seen that the heavy metals were extracted essentially quantitatively with the aid of the compounds of this invention, whereas the tributyl phosphate control achieved only a partial extraction.

TABLE I.—PERCENT METAL NITRATES EXTRACTED FROM 6 N HNO₃

| Extractant | Percent | |
| --- | --- | --- |
| | Th(IV) | U(VI) |
| $(C_4H_9O)_3PO$ | 60 | 72 |
| $(C_2H_5O)_2P(O)\text{—[perfluorocyclopentenyl]—}P(O)(OC_2H_5)_2$ | 100 | 91 |
| $C_6H_5(C_6H_5)P(O)\text{—[perfluorocyclopentenyl]—}P(O)(C_6H_5)(OC_2H_5)$ | 99 | 99 |
| $(C_6H_5)_2P(O)\text{—[perfluorocyclopentenyl]—}P(O)(C_6H_5)_2$ | 90 | 100 |

What is claimed is:

1. A perfluoro-1-cycloalken-1,2-ylenediphosphonic acid of the formula

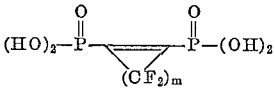

wherein $m$ is from 2 to 4.

2. Hexafluoro-1-cyclopenten-1,2-ylenediphosphonic acid.

References Cited

UNITED STATES PATENTS

| | | | |
| --- | --- | --- | --- |
| 2,486,657 | 11/1949 | Kosolapoff | 260—502.4 |
| 2,594,454 | 4/1952 | Kosolapoff | 260—502.4 |
| 3,202,692 | 8/1965 | Weil et al. | 260—502.4 |
| 3,419,595 | 12/1968 | Hansen | 260—502.4 |

BERNARD HELFIN, Primary Examiner

J. E. EVANS, Assistant Examiner

U.S. Cl. X.R.

23—14.5; 210—38; 252—9, 89; 260—79 R, 92.8 R, 464, 501.21, 505.5, 652 R, 999